United States Patent Office 3,537,733
Patented Nov. 3, 1970

3,537,733
PIPE CONNECTION INCORPORATING A DEFORMABLE PACKING
Georges Lucien Henri Martin, Paris, France, assignor to Societe de Precision General (Societe Anonyme), Montreuil-sous-Bois, Seine-Saint-Denis, France
Filed Apr. 9, 1968, Ser. No. 719,935
Claims priority, application France, Apr. 13, 1967, 102,549
Int. Cl. F16l 19/00; F16j 15/08
U.S. Cl. 285—332.3          13 Claims

ABSTRACT OF THE DISCLOSURE

A pipe connection comprising two end-pieces the cooperating male and female surfaces of which include a central frusto-conical surface and two terminal radial surfaces. A deformable frusto-conical packing fitted and compressed between the two frusto-conical surfaces is bounded by inner and outer surfaces having an in inflexion point in their middle so that the successive inwardly and outwardly convex sections engage the cooperating frusto-conical surfaces and the packing edges are extruded between the suitably shaped corresponding ends of the two frusto-conical surfaces.

---

Fluid-tightness of connections under extreme conditions of vacuum, pressure, high and low temperatures and vibrations is ensured by an extrusion of metal packings.

An old connection of the above type includes two end-pieces, the surfaces of which registering with each other are frusto-conical surfaces, that is, surfaces sloping with reference to the axis of the connection and which do not extend throughout the radial thickness of the end-pieces, while they are connected by rounded surfaces with bearing surfaces parallel with the axis of the connection, so that said frusto-conical surfaces form with the corresponding bearing surfaces two shoulders at an acute angle, engaged by a frusto-conical metal packing of a reduced thickness and of a rectangular cross-section, the length of said packing being larger than the length of the frusto-conical surfaces, so that the axial tightening of the end-pieces produces a compression and an extrusion of the packing.

Such packings ensure an excellent fluid-tightness but they show in particular the following drawbacks:

(a) A defective securing of the packing on the end-pieces or flanges for all positions of the latter;

(b) A prohibitive outer diameter of the actual packing, which leads to an exaggerated bulk of the connections;

(c) An imperfect fluid-tightness against pressure and vacuum during the tightening of the end-pieces or flanges;

(d) Absence of a coaxial self-alignment of the arrangement when fitted with a radial clearance reduced to zero;

(e) A lack of elastic memory of the packing when the connections or flanges are dismantled, whereby such a dismantling becomes difficult, as also the removal of said packing.

The general object of the present invention consists in providing a connection for coupling pipes showing improved properties as concerns assembly, bulk and fluid-tightness.

The particular object of the invention consists in producing a connection wherein the packing and the coupling end-pieces are sized with reference to each other in a manner such that after the two end-pieces have been brought together through the agency of a tightening member, the packing is, in succession, First urged into bending beyond the limit of electricity and compressed between the surfaces of the end-pieces facing each other;

On the other hand, wedged between the conical surfaces of the end-pieces facing each other; and Lastly engaged by the sharp angles formed on said end-pieces.

These three actions on the packing produce a perfect fluid-tight sealing of the packing between its end-pieces, whereby an improved sealing of the connection can be ensured in conveying means, said connection being capable of resisting both high and very low internal pressures, as well as high and low temperatures and also vibrations and flexional stresses.

In order to obtain the above-mentioned results, the connection according to the invention includes in combination:

Two end-pieces facing each other and showing on their sides registering with each other, parallel frusto-conical surfaces which do not extend throughout the radial thickness of the end-pieces and are connected at their ends with annular substantially radial surfaces, Said surfaces facing each other and merging into the frusto-conical surfaces being obtained through the agency of sharp ridges followed by rounded surfaces and further sharp ridges while a metal packing showing a double curvature is adapted to be fitted through its ends inside said rounded portions of the end-pieces on the one hand and engages at an intermediate point of its length, the frusto-conical surface facing each rounded portion considered on the other hand, means being provided for urging the two end-pieces axially towards each other.

Further features and advantages of the invention will appear in the reading of the following description, reference being made to the acccompanying drawings illustrating various embodiments disclosed by way of example and by no means in a limiting sense. In said drawings.

Turning to the drawings, the connection includes the end-pieces 1 and 2, each provided with an inner surface 3 and 4, respectively. The female end-piece is provided with a male thread 5, followed by a large six-sided element 6 connected with the outer cylindrical extension 7 through the fillet 8.

The male end-piece includes a shoulder 9 connected with a cylindrical extension 10 by a fillet 11.

In order to tighten the end-pieces together, the connection is provided with a six-sided nut 12.

An annulus 13 serves for limiting the return movement outwardly of the nut 12.

The embodiment illustrated, the outer extensions of the end-pieces have an inner and outer diameter equal to those of the cross-sections of the tubes to be connected, which are shown at 14 and 15. The end-pieces are secured to the corresponding tubes by arc-welding or any other suitable connecting method, as illustrated at 16 and 17.

The end-piece 1 includes an annular radial surface 18 (FIG. 2) merging over a sharp ridge 21 into a frusto-conical surface 20 merging over the sharp ridge 23 followed by the rounded section 22 into a further annular surface 24.

Figure 1:
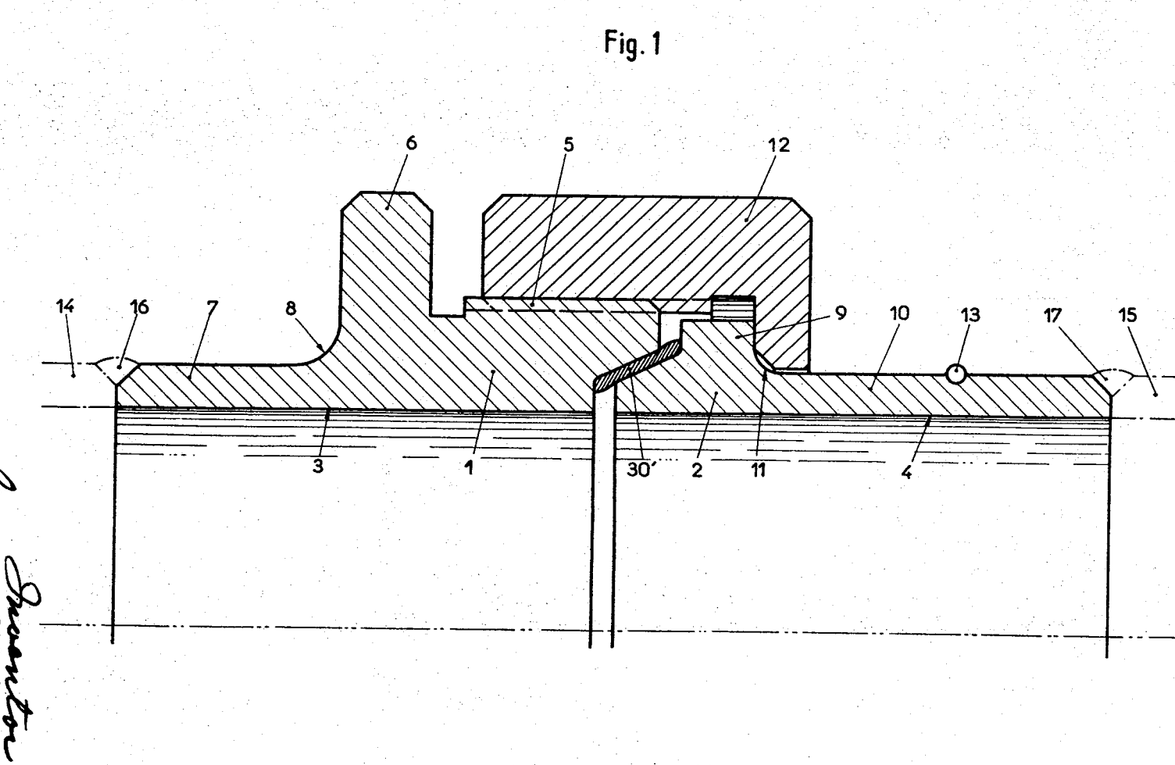
FIG. 1 is a half-sectional view in a diametrical plane.
Figure 2:
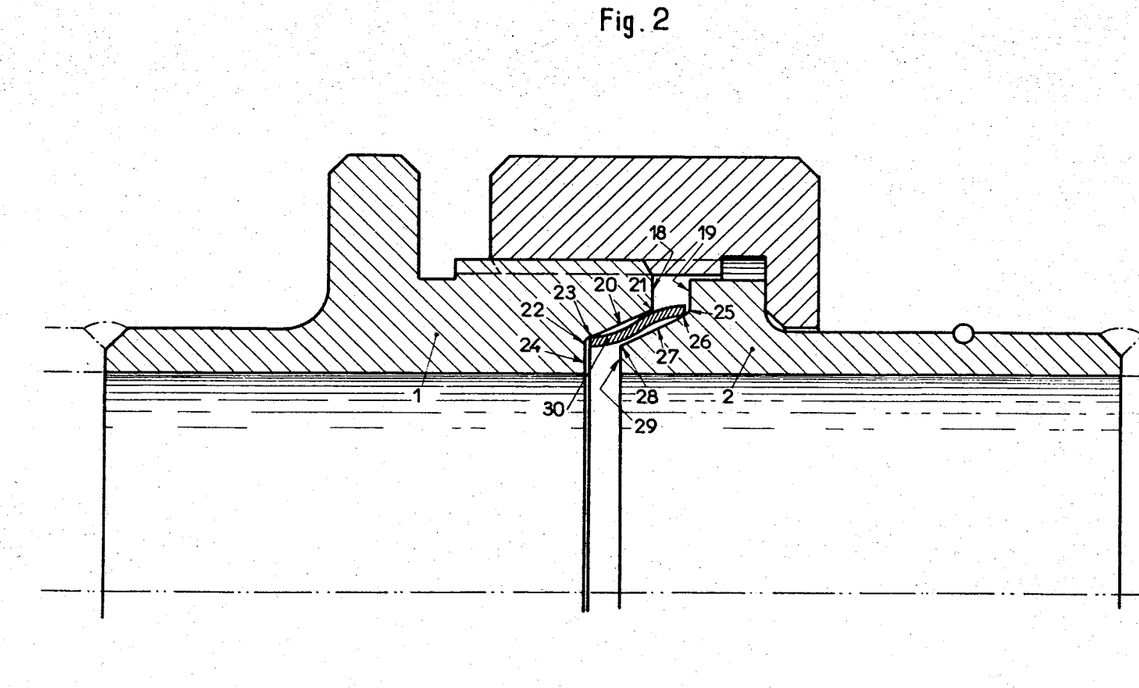
FIG. 2 is a corresponding view illustrating various parts of the connection in their relative position before assembly and tightening.

Similarly, the end-piece 2 is provided with a radial annular surface 29, merging over a sharp ridge 28 into a frusto-conical surface 27, parallel with the frusto-conical surface 20 of the other end-piece 1 and merging again over a sharp ridge 26, followed by a rounded portion 25, into a radial annular surface 19.

The packing of the connection designated as a whole by the reference 30 is essentially rigid and constituted by a material which is softer than that forming the end-pieces. The end-pieces and the packing may be constituted by the same metal such as a light alloy, but in such a case the packing is preferably subjected to a thermal annealing treatment.

The ratio between the hardness of the metal of the packing and that of the end-pieces is defined according to the application considered.

Figure 4:
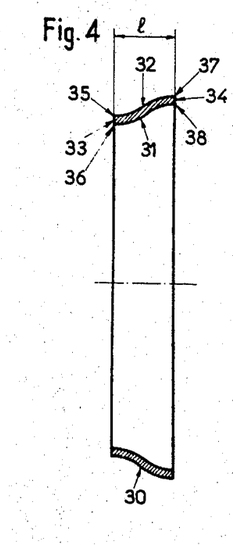
FIG. 4 is a diametrical cross-section of said packing.
Figure 5:
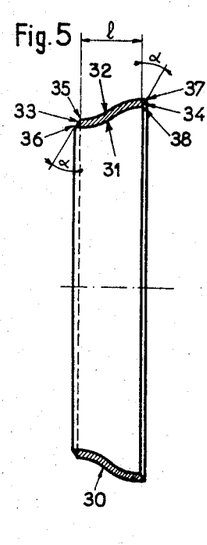
FIG. 5 is a diametrical cross-section of a modification of the packing forming part of the connection.
Figure 6:
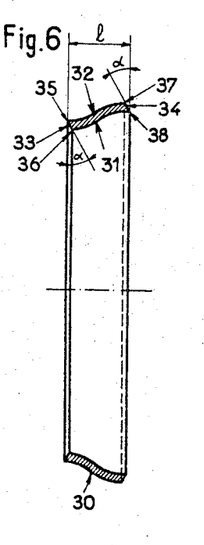
FIG. 6 is a diametrical cross-section of a further modification of the packing forming part of the connection.

In the embodiments illustrated in FIG. 4 and in FIGS. 5 and 6, the packing 30 is given an annular shape, the generating lines of which have an outline showing a double incurvation so that it is defined by inner and outer surfaces 31 and 32 and by terminal surfaces 33 and 34.

The packing 30 shows thus a radial cross-section having a double curvature and it may be used with end-pieces provided with frusto-conical annular surfaces parallel with one another. The ridges of the packing defined by the annular meeting lines between its lateral surfaces having a double curvature and its terminal surfaces are designated respectively by the reference numbers 35, 36, 37, 38.

Figures 3, 7:
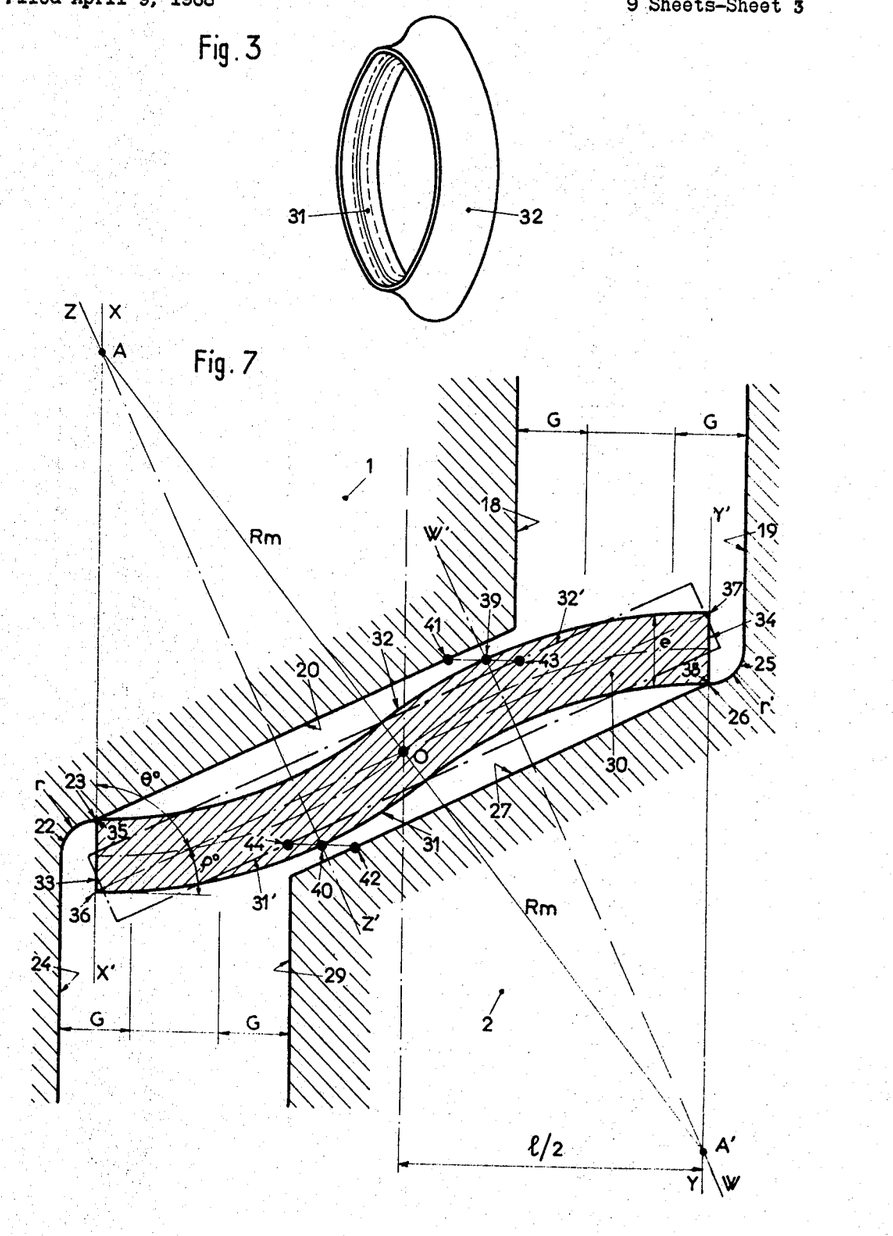
FIG. 3 is a perspective view of the packing forming part of the connection.
FIG. 7 is a cross-section on a larger scale of the packing and of a part of the bearing surfaces therefor showing the manner of defining the size relationship between the packing and the end-pieces.

In the position illustrated in FIG. 7 the angle between the packing and the axis of the connection is defined by a straight line joining the inner ridge 36 of the packing at the end lying nearest the connection axis to the outer ridge 37 at the end remote from said axis. Said line is parallel with the generating lines of the annular frusto-conical surfaces 20 and 27 of the end-pieces.

When the packing lies between the two end-pieces and before any manual or mechanical pressure is exerted on the packing, so as to urge the latter into the rounded sections 22 and 25 at its opposite ends, its ridge 35 faces the sharp ridge 23, while its ridge 38 faces the sharp ridge 26.

The terminal surface 33, the sharp ridges 35 and 36 of the packing and the sharp ridge 23 of the end-piece 1 are located in a common radial plane illustrated by the axis XX'.

Similarly, the terminal surface 34 of the packing with its ridges 37 and 38 is located in a common radial plane illustrated by the axis YY', together with the sharp ridge 26 on the end-piece 2.

Figure 8:
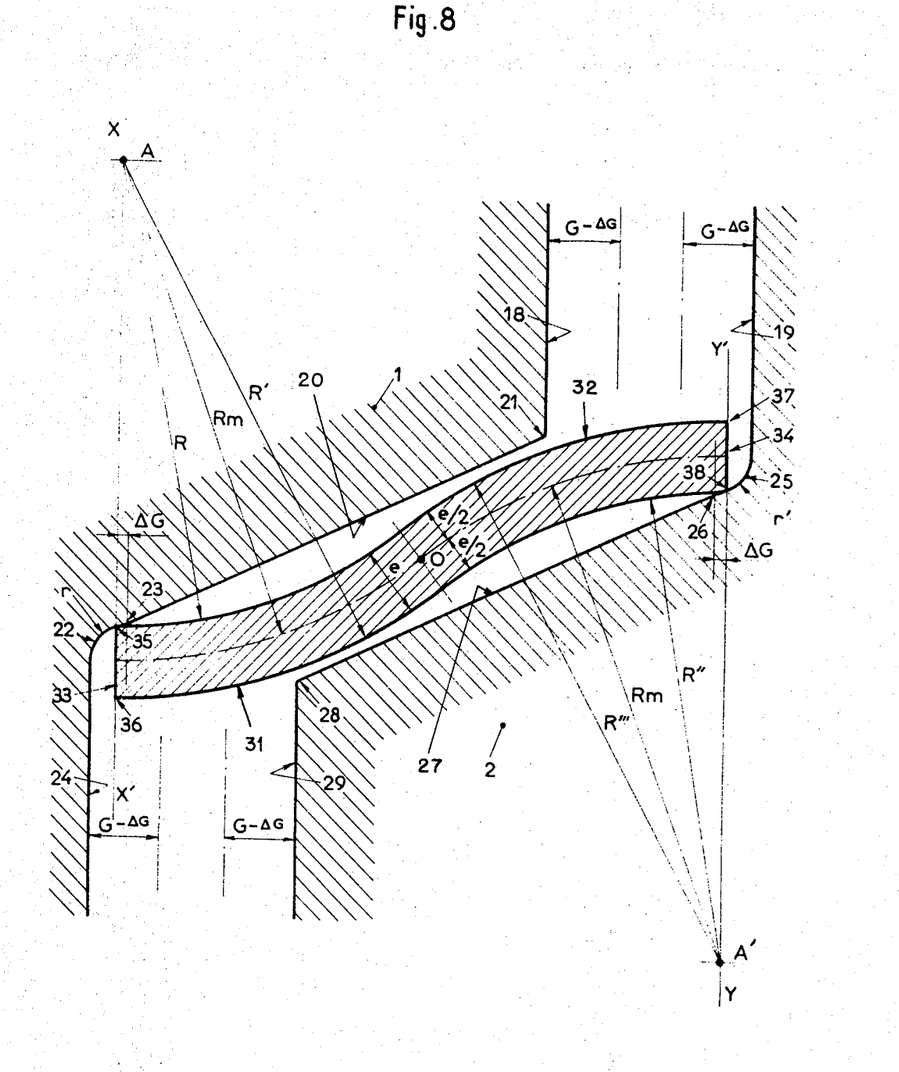
FIG. 8 is a cross-section similar to FIG. 7 of the packing and of a portion of the end-pieces, the latter being partly fitted inside one another, said figure showing the radii of curvature of the packing surfaces.

Coming now to FIG. 8, the securing of the packing for all positions of the end-piece 1, is ensured by a manual or mechanical pressure exerted on the outer terminal surface 34 of the packing.

The result of this pressure is a wedging and a slight extrusion of the ridge 35 of the packing inside the rounded section 22. The maximum engagement of the packing is limited by the contact along an annular line between the outer surface 32 of the packing 30 and the frusto-conical surface 20 of the end-piece 1.

Similarly, it is possible to secure the position of the packing whatever the position of the packing may be by a manual or mechanical pressure exerted on the outer surface 33 of the packing. The result of said pressure is a wedging and a slight extrusion of the ridge 38 of the packing inside the rounded section 28. The maximum path of engagement of the packing 30 is limited by the contact along a generating line between the surface 31 of the packing 30 and the frusto-conical surface 27 of the end-piece 2.

According as to whether the packing 30 has been held in position by pressure at either end, it is possible to engage, either the end-piece 2 or the end-piece 1 over the said packing and it is then sufficient to exert a manual or mechanical pressure on the end-piece fitted afterwards on the packing, so as to obtain a rigid interengagement between the two end-pieces 1 and 2 over the packing 30.

This operation leads to a coaxial alignment without any radial clearance between the three parts 1, 2 and 3.

The packing 30 and the end-pieces 1–2 are shaped in a manner such that when the connection is tightened, the packing is developed and compressed in a manner such that its slope remains substantially the same as that of the annular frusto-conical surfaces 20 and 27 of the end-pieces and said packing provides three successive effects producing fluid-tightness, which solves thus all the problems of fluid-tightness preventing leaks by ensuring a gradual clamping until a locking is obtained. A first fluid-tight effect is obtained by the simultaneous urging towards each other of the frusto-conical annular surfaces 20 and 27 of the end-pieces 1 and 2. Said movement of the end-pieces towards each other results firstly in an extrusion of the ridges 35 and 38 of the packing in the rounded portions 22 and 25 and secondly in an action of the annular frusto-conical surfaces 20 and 27 on the projecting points 39 and 40 (FIG. 7), which develops longitudinally the medial axis of the cross-section of the packing 30, whereas the movement of the radial surfaces 19 and 24 of the two end-pieces has a tendency to reduce said longitudinal axis. The packing is thus subjected to two associated strains, of which the opposed actions increase the compression exerted on the packing.

These two strains being higher than the elastic limit of elasticity of the packing, the ridges 35 and 38 are upset into the rounded portions 22 and 25 and the case is the same for the terminal surfaces 33 and 34 of which the ridges 36 and 37 are upset and extruded over the terminal radial surfaces 24 and 19.

Obviously, the continuity of the compressional stresses is ensured by the permanent contact between the frusto-conical annular surfaces 20 and 27 on the inner and outer surfaces of the packing at the projecting points 39 and 40 during the tightening operation.

As illustrated in FIG. 8 and in order that the packing may be fitted inside the rounded portion 22 or 25 before it is deformed and brought into a fluid-tight position, the flanges of the end-pieces receive a diametrical cross-section in registry with the ridges 23 and 26, which is slightly less than equal to or larger than that measured on the packing in registry with the sharp ridges 35 and 38 according to the desired fit to be obtained.

In practice, the selected fit for the packing with reference to the end-pieces is similar to standard fits and depends on the metal used for executing the end-pieces and the packing.

There exists a practical value for the slope of the frusto-conical surfaces 20 and 27 and for the angle defined between the axis joining the ridges 36 and 37 and the axis of the connection.

In those connections, where the slope defined hereinabove and illustrated by the letter $\rho$ in FIG. 7 is under 15°, the flanges of the end-pieces can be disconnected with a considerable difficulty when it is desired to separate the two pipe sections with reference to each other. The release of the packing with reference to the flanges of the end-pieces may be ensured readily when desired in those connections where the angle ρ is equal to about 30°.

In FIG. 7, the average radius of curvature of the inner and outer surfaces of the packing is expressed by the formula $$Rm = \frac{b^2 + c^2 - 2bc \cos \theta}{2(b \cos \theta - c)}$$

The size relationship between the packing and the frusto-conical surfaces of the end-pieces 1 and 2 is expressed by the following equation:

$$\left(Rm + \frac{e}{2}\right) \sin \theta = Rm - \cos \theta \frac{\left(e \tan \theta - \frac{e}{2 \cos \theta}\right)}{(2)} Rm + \frac{e}{2}$$

In the above expressions, $Rm$ is the radius in mm. of one arcuate half-axis whereof the center A is located on the axis XX' forming an extension of the terminal surface 33 of the packing 30, or else on the axis YY', as illustrated in FIG. 7.

$b$ is one-half of the length in mm. of a straight line joining the ridge 37 of the packing and passing through the inflexion joint $\theta$ of the medial axis of the packing.

Figure 12:
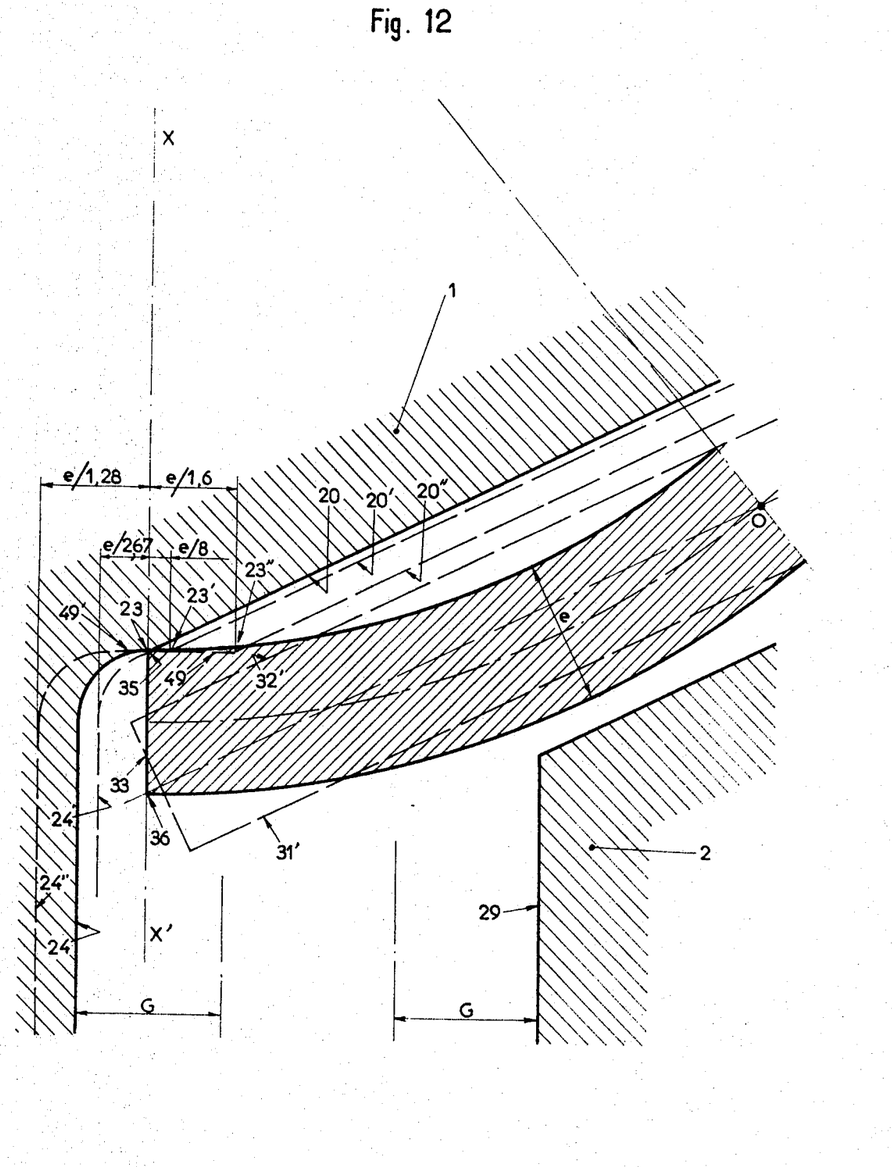
FIGS. 12 and 13 are partial cross-sections on a larger scale of the packing and of the end-pieces, showing a modification of the means holding the packing and of the depth of the rabbets associated therewith.
Figure 13:
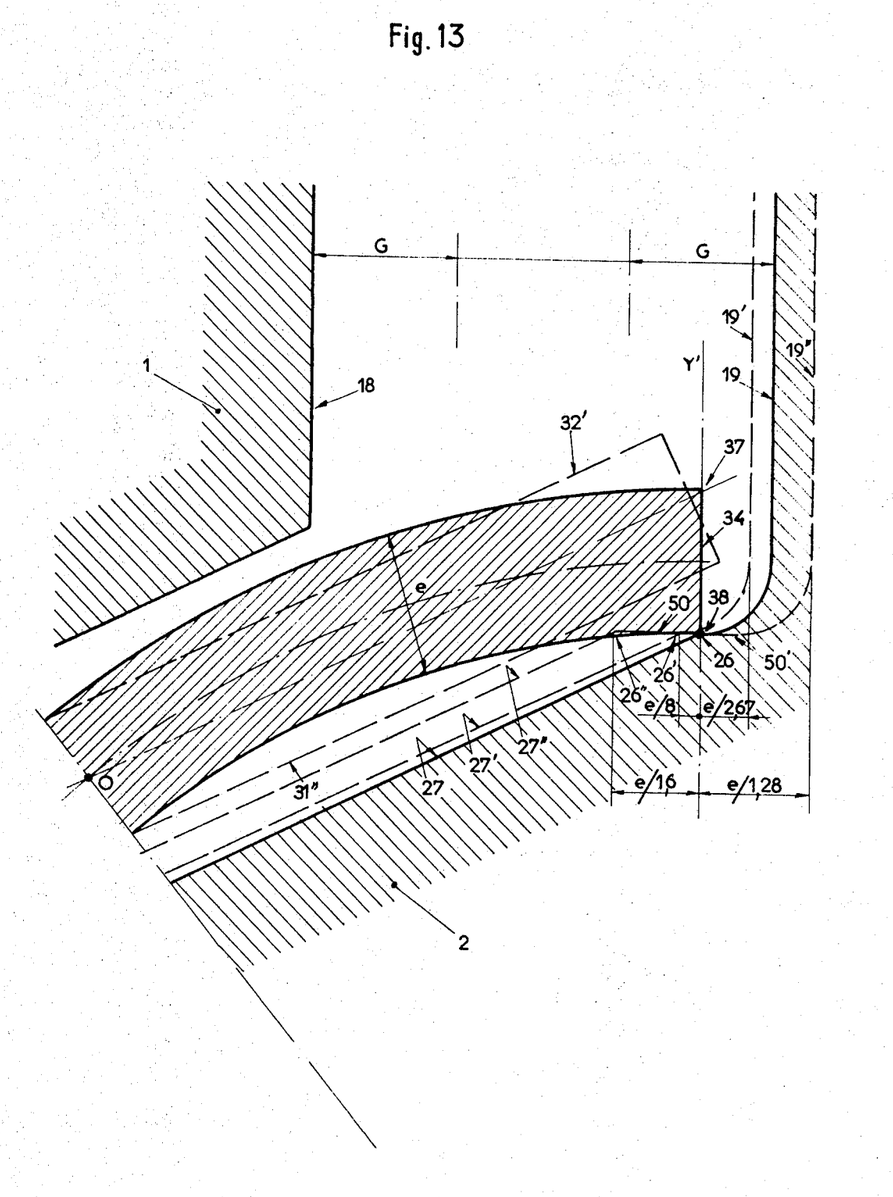

$c$ is equal to one-half of the thickness $e/2$ of the packing expressed in mm. and it is also equal to the radii $r$ and $r'$ expressed in mm. of the rounded portions 22 and 25 of which the centers are located respectively on the axes XX' and YY' (FIGS. 7, 12 and 13).

$\theta$ is the angle the value of which in degrees is the complement of 90°, which means $\theta = 90° - \rho$, the angle $\rho$ being expressed in degrees and extending between the axis joining the ridges 36 and 37 of the packing and a straight line parallel with the axis of the connection.

$e$ expresses in mm. the thickness of the packing.

As illustrated in FIG. 8, the radii of curvature R and R' of the outer and inner surfaces of the packing may be expressed as follows:

$$R = Rm - \frac{e}{2} \text{ and } R' = Rm + \frac{e}{2}$$

$e/2$ being equal to the half thickness of the packing expressed in mm., while R and R' are the outer and inner radii of curvature of the left-hand half section of the packing expressed also in mm.

Symmetrically, the radii of curvature R'' and R''' of the inner and outer surfaces of the other half section of said packing having for a center the point A' located on the axis Y-Y' may be expressed as follows:

$$R'' = Rm - \frac{e}{2} \text{ and } R''' = Rm + \frac{e}{2}$$

It can also be mentioned that the breadth $e$ of the packing (FIGS. 4 to 6) and its half length $b$ are bound, with the same notations as hereinabove, by the relationship $e = 2b \cos \rho$.

Figure 9:
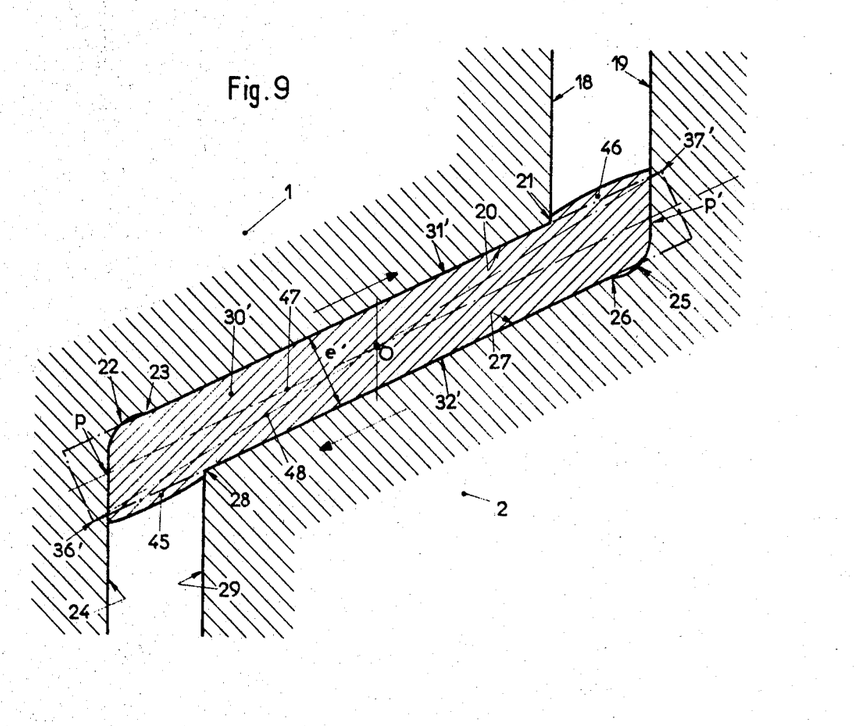
FIG. 9 is a cross-section on a larger scale of the packing and of a portion of the end-pieces in the position for which they ensure a fluid-tight closure.

Turning to FIG. 9, which is a radial cross-section of the packing when tightened for maximum fluid-tightness, the second effect of fluid-tightness is obtained by a shearing and compression of the inner surfaces 31' and 32' of the packing deformed between the annular frusto-conical surfaces 20 and 27 of the end-pieces.

The third fluid-tightness effect is obtained simultaneously with the second effect by a rolling, jumping and engagement of the metal forming the packing by the sharp ridges 21 and 28 and also by the ridges 23 and 26 of the end-pieces. Said engagement is furthered by the increase in the thickness of the packing from the value $e$ to the value $e'$, under the action of the tightening stresses.

The packing thus deformed by the tightening stresses fills the space comprised between the annular frusto-conical surfaces facing each other and forms convex sections 45 and 46 and closes substantially the rounded portions 22 and 25 under the action of the jumping of the terminal surfaces 33 and 34 of the packing.

In other words, when the end-pieces and packing occupy their tightened position (FIG. 9) the length of the compressed packing measured between the points $p$ and $p'$, that is, the length of a line 47 forming the axis of the packing at mid-distance between the surfaces 31' and 32' of said packing and located in a plane passing through the axis of said joint, is shorter than the line 48 joining the ridges 36' and 37' of the packing, when developed freely and subjected to no stresses ascribable to compression and to extrusion.

The sealing thus obtained retains in a perfectly reliable manner fluid-tightness with reference to fluids and to vacuum even if the connection is subjected to violent vibrations during its use or if the packing is subjected to flexional stresses.

It is, however, of interest that, in the connection forming the object of the invention, and which is executed for use in pipe sections which require a dismantling of their different parts, the mutual joggling of the packing and of the end-pieces may be such that it does not prevent such a dismantling.

When dismantling, the packing is released easily from its bearing surfaces in contradistinction with prior connections wherein the residual deformation of the packing upon dismantling may lead to difficulty in removing the packing out of its bearing surface and in separating the end-pieces.

As a matter of fact, when dismantling the connection, the residual elasticity of the packing has a tendency to increase its length and consequently to space the end-pieces apart. At the same time the packing has a tendency to resume its double curvature which, although slight, releases the convex extrusions 45 and 46 with reference to the ridges 28 and 21, which allows moving the end-pieces apart. The annular rabbets formed by the rounded sections 22 and 25 do not engage the corresponding surfaces when the connection is being tightened so that the tightening stress acts solely on the actual packing 30.

To this end, the various elements receive a size such that the radial terminal cooperating surfaces 18–19 and 24, 29 of the end-pieces remain apart when the annular frusto-conical surfaces are in contact with the lateral compressed surfaces 31' and 32' of the developed packing.

In FIGS. 7 and 8, the stress for tightening the end-piece 1 is applied to the point 39 of the outer surface 32 of the packing 30. The point 39 is located on a straight line W, W' perpendicular to the straight line connecting the ridges 36 and 37 of the packing and passing through the center A' of the radii of curvature $Rm$, R'' and R''', said point 39 lying at a distance from A' which is equal to the radius of curvature having a value R'''.

Similarly, the tightening stress exerted on the end-piece 2 is applied at a point 40 of the surface 31 of the packing 30. Said point 40 is located on a straight line ZZ' perpendicular to the straight line joining the ridges 36 and 37 of the packing and passing through the center of the radii of curvature $Rm$, R and R' at a distance from said center A equal to the radius of curvature having a value R'.

Figure 10:
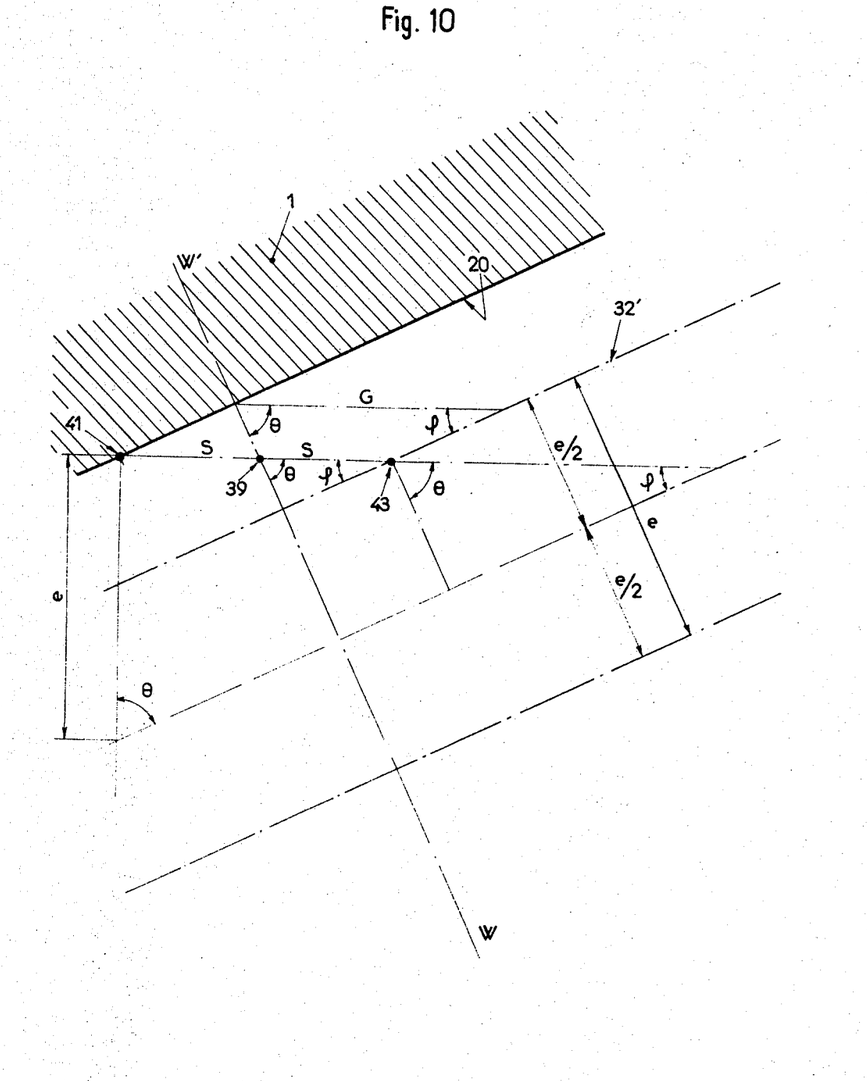
FIGS. 10 and 11 are partial cross-sections showing diagrammatically the packing in its developed condition together with a part of the end-pieces and also the manner of defining the paths of development and tightening of the packing.
Figure 11:
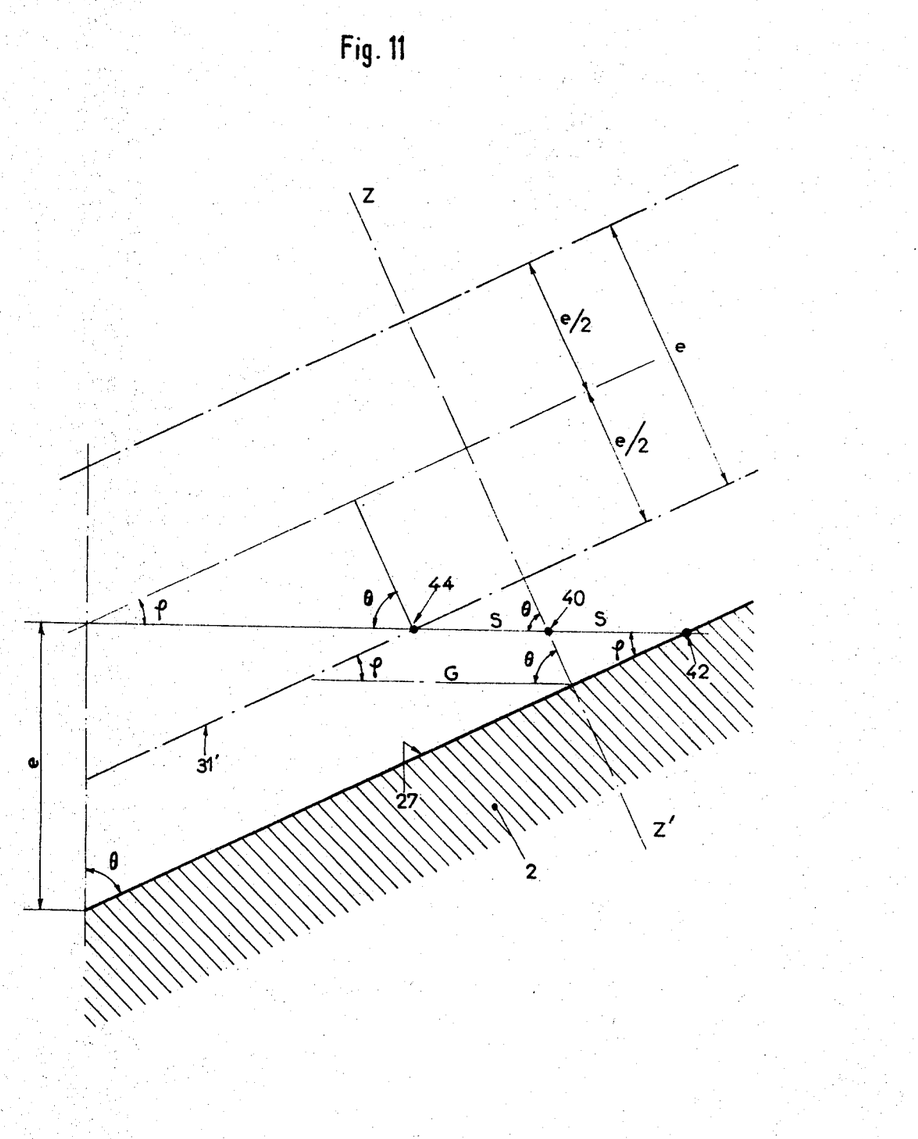

The half distance provided for fitting as illustrated in FIGS. 10 and 11 of the packing in the end-piece 1 is defined by a section of a straight line parallel with the axis of the connection extending between the point 41 located on the annular frusto-conical surface 20 and the point 39 located on the outer surface 32 of the packing (FIG. 7).

The half distance provided for the fitting of the packing in the end-piece 2 is defined similarly by a section of a straight line parallel with the axis of the connection and extending between the point 42 located on the annular frusto-conical surface 27 and the point 40 on the inner surface 31 of the packing (FIG. 7).

The half distance required for the development and tightening of the packing through action of the annular frusto-conical surface 20 on the projecting point 39 of the packing is defined by a section of a straight line parallel with the axis of the connection extending between said point 39 and the point 43 located on the surface 32' of the developed packing.

Similarly, the half distance required for the development and tightening by the action of the frusto-conical surface 27 at the point 40 of the packing is defined by a section of a straight line parallel with the connection axis and extending between said point 40 and the point 44 located on the surface 31' of the developed packing.

The total half distance required by the fitting, development and tightening of the connection is expressed by the formula:

$$G = e \tan \theta - \frac{e}{2 \cos \theta}$$

G being said half distance required by the fitting, development and tightening of the connection in mm. while $e$ expresses in mm. the thickness of the packing and $\theta$ is the difference between 90° and the angle $\rho$ expressed in degrees.

The half distance provided for the fitting and the half distance provided for the development and tightening have for their common value $S = C/2$, S defining thus the half distance provided for fitting and the half distance provided for development and tightening expressed in mm.

It should also be mentioned that furthermore and in accordance with the invention:

The axis AOA' should be the axis of symmetry of the half section of the packing 30 and should be substantially equal to 2 R$m$.

The point O forms the center of symmetry of the cross-section of the packing 30. The half length of the section of the axis extending between the point 36 or 37 and the center of symmetry O and of which the value is $b$ expressed in mm. should be equal to the thickness $e$ of the packing 30 expressed in mm. and multiplied by a coefficient ranging between 3 and 6, said coefficient being applicable to all the values of the angle $\rho$ expressed in degrees and ranging between 15 and 45°, the angle $\rho$ being the half-apical angle defining the common slope, with reference to the axis of the connection, of the annular frusto-conical surfaces 20 and 27. The sharp ridges 23 and 26 may be separated from the adjacent rounded sections by cylindrical surfaces of which the generating lines are parallel with the axis of the end-pieces and consequently the spacing between said ridges and the axes XX' and YY' varies and is preferably comprised between a minimum value equal to $e/8$ and a maximum value equal to $e/1.6$, whereby two annular surfaces 49 and 50 are defined for the fitting of the packing, $e$ being again the thickness of the packing expressed in mm. (FIGS. 12 and 13). In the cross-sectional FIGS. 12 and 13, the centers of curvature at 22 and 25 having as radii $r$ and $r'$ are located, in this case, on lines parallel with the axis of the connection, passing through the intersection between the terminal surface 33 or 34 of the packing and the medial axis having as a radius R$m$ and defining on the above-mentioned terminal surfaces the half thickness $e/2$ of the cross-section of the packing before its development. In this case again, the sharp ridges 23 and 24 are no longer located on the axes XX' and YY'. The depth of the rabbets, that is, the distance between the axis XX' and the terminal radial surface 21 on the one hand and between the axis YY' and the terminal surface 19 on the other hand, should be preferably comprised between a maximum value equal to $e/1.28$ and a maximum value equal to $e/2.67$ whereby two annular surfaces 49' and 50' are defined. For the fitting of the packing, $e$ being the thickness of the packing expressed in mm. (see FIGS. 12 and 13), the terminal surfaces 33 and 34 of the packing 30 may slope by an angle $\alpha$ ranging between 0 and 30°, towards the outside of the packing, the apex of said angle $\alpha$ being located respectively at points 35 and 38 (FIG. 5).

The terminal surfaces 33 and 34 of the packing may also slope by an angle $\alpha$ ranging between 0 and 30° towards the inside of the packing, the apex of said angle being located respectively at the points 35 and 38 (FIG. 6).

The radii $r$ and $r'$ expressed in mm. of the rounded sections 22 and 25 are preferably equal to one-half the thickness $e/2$ of the packing expressed in mm.

The axis joining the ridges 36 and 37 of the packing when not developed, coincides with the axis 47 of the packing in its developed condition.

The embodiments described hereinabove and illustrated in the drawings are given solely by way of example and in a non-binding sense and obviously also, it is possible to modify the shape, arrangement and assembly of the different parts. Thus, instead of being limited by surfaces with a gradually varying curvature, the packing may be provided with a broken-lined outline; the packing and the end-piece may also be of plastic.

What I claim is:

1. A pipe connection comprising a male and a female end-piece for two coaxial pipe sections, each end-piece being provided with a frusto-conical surface extending over a fraction of the radial breadth of the corresponding end-piece and with inner and outer radial extensions of said frusto-conical surfaces with the interposition at the re-entrant angle formed between each frusto-conical surface and one radial extension of a sharp ridge and of a rounded section and at the projecting angle between each frusto-conical surface and the other radial extension of a further sharp ridge, the frusto-conical surface of the male end-piece confronting the frusto-conical surface of the female end-piece with a spacing therebetween and the corresponding radial extensions of both end-pieces also facing each other with a spacing therebetween, means adapted to shift the end-pieces towards each other, a generally conical, reversely curved, deformable packing including diagonally opposed edges and oppositely extending convex surfaces carried between the frusto-conical surfaces of the two end-pieces and the generating lines of the inner and outer surfaces of which show a point of inflexion dividing said generating lines into two half portions, each of said convex surfaces when compressed bearing against the frusto-conical surfaces and the diagonally opposed edges of said packing when compressed between the end-pieces engaging the inner and outer radial extensions of the male and female end-pieces.

2. A pipe connection as claimed in claim 1, wherein the radius of curvature R$m$ of the medial longitudinal axis of the packing is equal to $$Rm = \frac{b^2 + c^2 - 2bc \cos \theta}{2(b \cos \theta - c)}$$

$b$ being the half length in mm. of a line extending between diagonally opposed edges of the packing, $c$ being the half thickness in mm. of the packing and $\theta$ being the difference between 90° and the angle measured in degrees between said diagonal line and the axis of the connection.

3. A pipe connection as claimed in claim 1 wherein the size data of the packing and of the frusto-conical surfaces are defined by the relationship $$\left(Rm + \frac{e}{2}\right) \sin \theta = Rm - \cos \theta \frac{\left(e \tan \theta - \dfrac{e}{2 \cos \theta}\right)}{2} \frac{Rm}{Rm + \dfrac{e}{2}}$$

R$m$ being the radius of each half of the medial longitudinal axis of the packing and $e$ being its thickness.

4. A pipe connection as claimed in claim 1 wherein the radii of curvature R and R' of the outer and inner surfaces of the packing halves are given out in mm. by the relationships $$R = Rm - \frac{e}{2} \text{ and } R' = Rm + \frac{e}{2}$$

Rm being the radius of each half of the medial longitudinal axis of the packing, e being its thickness.

5. A pipe connection as claimed in claim 3, wherein the half path G executed for fitting, deforming and tightening the packing is expressed in mm. by $$G = e \tan \theta - \frac{e}{2 \cos \theta}$$

e being the thickness of the packing and $\theta$ the angle between a plane perpendicular to the axis of the packing and a diagonal line extending between the inner edge of the narrow end of the packing and the outer edge of the opposite end, $G/2$ corresponding to the fitting and the remaining $G/2$ to the deformation and tightening.

6. A pipe connection as claimed in claim 1, wherein the half length b of a straight line joining the inner edge of the transverse terminal surface of the packing nearer the axis of the connection to the outer edge of the other transverse terminal surface and passing through the inflexion point of the medical longitudinal axis of the packing is equal to the thickness of the packing multiplied by a coefficient ranging between 3 and 6 for values of the angle $\rho$ between last-mentioned straight line and the axis of the packing ranging between 15° and 45°, the breadth of the packing being equal to $2b \cos \rho$.

7. A pipe connection as claimed in claim 1, wherein the generating lines of the frusto-conical surfaces of the end-pieces in a given radial plane are parallel with the line joining in the same plane the inner edge of the terminal surface of the packing nearer the axis of the connection to the outer edge of the opposite terminal surface.

8. A pipe connection as claimed in claim 1, wherein a cylindrical surface coaxial with the connection is provided between the rounded section of each frusto-conical surface and the adjacent sharp ridge.

9. A pipe connection as claimed in claim 1, wherein the sharp ridges adjacent the rounded sections of the frusto-conical surfaces are spaced longitudinally of the connection with reference to the transverse terminal surfaces of the packing by amounts ranging between $e/8$ and $e/1.6$, e being the thickness of the packing.

10. A pipe connection as claimed in claim 1, wherein the transverse terminal surfaces of the packing are spaced with reference to the cooperating radial extensions of the frusto-conical surfaces by amounts ranging between $\epsilon/1.28$ and $\epsilon/2.67$, $\epsilon$ being the thickness of the packing.

11. A pipe connection as claimed in claim 1, wherein the transverse terminal surfaces of the packing slope by an angle not greater than 30° with reference to a plane perpendicular to the axis of said packing.

12. A pipe connection as claimed in claim 1, wherein the radii of the rounded sections are equal to one half the thickness of the packing.

13. A pipe connection as claimed in claim 1, wherein the straight line connecting in a radial cross-section of the free packing the inner edge of the terminal surface nearer the axis of the connection with the outer edge of its opposite terminal surface coincides with the medial axis of the compressed and deformed packing, which axis is parallel with the corresponding generating lines of the frusto-conical surfaces.

References Cited

UNITED STATES PATENTS

| 1,721,326 | 7/1929 | Wilson | 277—236 X |
| 2,270,519 | 1/1942 | Fisher | 285—332.3 X |
| 2,992,840 | 7/1961 | Reynolds et al. | 285—332.3 X |

FOREIGN PATENTS

| 609,715 | 9/1960 | Italy. |

THOMAS F. CALLAGHAN, Primary Examiner

U.S. Cl. X.R.

285—340; 277—169, 236

PO-1050
(5/69)

UNITED STATES PATENT OFFICE
CERTIFICATE OF CORRECTION

Patent No. 3,537,733        Dated November 3, 1970

Inventor(s) Georges Lucien Henri Martin

It is certified that error appears in the above-identified patent and that said Letters Patent are hereby corrected as shown below:

Col. 1, line 70, "electricity" should read --elasticity--

Col. 3, line 17, after "further" insert --radial--

Col. 5, line 19, the last part of the equation should read:

$$\frac{Rm}{Rm + \frac{e}{2}}$$

Col. 9, line 28, "medical" should read --medial--

SIGNED AND
SEALED
JAN 5 1971

(SEAL)
Attest:

Edward M. Fletcher, Jr.
Attesting Officer

WILLIAM E. SCHUYLER, JR.
Commissioner of Patents